US007319576B2

(12) United States Patent
Thompson (10) Patent No.: US 7,319,576 B2
(45) Date of Patent: Jan. 15, 2008

(54) APPARATUS AND METHOD FOR PROVIDING DIFFERENTIAL PROTECTION FOR A PHASE ANGLE REGULATING TRANSFORMER IN A POWER SYSTEM

(75) Inventor: Michael J. Thompson, Pullman, WA (US)

(73) Assignee: Schweitzer Engineering Labortories, Inc., Pullman, WA (US)

( * ) Notice: Subject to any disclaimer, the term of this patent is extended or adjusted under 35 U.S.C. 154(b) by 223 days.

(21) Appl. No.: 11/208,272

(22) Filed: Aug. 18, 2005

(65) Prior Publication Data

US 2007/0041137 A1    Feb. 22, 2007

(51) Int. Cl.
    *H02H 3/00*    (2006.01)
(52) U.S. Cl. ............................. 361/85; 361/76; 702/58
(58) Field of Classification Search ................. 361/80; 324/521; 702/58
    See application file for complete search history.

(56) References Cited

U.S. PATENT DOCUMENTS

| 4,825,326 | A * | 4/1989 | Andow et al. ................. 361/63 |
| 6,507,184 | B1 * | 1/2003 | Elston ......................... 324/107 |
| 6,518,767 | B1 * | 2/2003 | Roberts et al. ............. 324/521 |
| 6,670,721 | B2 | 12/2003 | Lof et al. |
| 6,841,976 | B1 * | 1/2005 | Sen et al. .................... 323/216 |
| 2002/0145841 | A1 * | 10/2002 | Williams et al. ........... 361/93.1 |
| 2002/0149893 | A1 * | 10/2002 | Kurosawa et al. ........... 361/76 |
| 2005/0201130 | A1 * | 9/2005 | Tarkiainen et al. ......... 363/164 |

FOREIGN PATENT DOCUMENTS

WO    WO 2005/064759 A1    7/2005

OTHER PUBLICATIONS

Tziouvaras, Demetrios A., "Protecting a 138 KV Phase Transformer EMTP Modeling and Model power System Testing," Nov. 2002, Pullman, Washington USA.

* cited by examiner

*Primary Examiner*—Michael Sherry
*Assistant Examiner*—Tien Mai
(74) *Attorney, Agent, or Firm*—Cook, Alex, McFarron, Manzo, Cummings, & Mehler, Ltd.

(57) ABSTRACT

Provided is an apparatus and method for providing differential protection for a phase angle regulating transformer having a load side and a source side in a three-phase power system. The method includes calculating a first positive sequence component and a first negative sequence component associated with incoming secondary currents detected on the source side, calculating a second positive sequence component and a second negative sequence component associated with outgoing secondary currents detected on the load side, applying a phase angle shift to the second positive sequence component and the second negative sequence component to form a compensated positive sequence component and a compensated negative sequence component, respectively, and determining an operate current value and a restraint current value for each of a positive and negative sequence differential element of the differential protection based on the compensated positive sequence component and the compensated negative sequence component.

25 Claims, 6 Drawing Sheets

FIG. 5                    BALANCED PHASORS

FIG. 6     UNBALANCED PHASORS

APPARATUS AND METHOD FOR PROVIDING DIFFERENTIAL PROTECTION FOR A PHASE ANGLE REGULATING TRANSFORMER IN A POWER SYSTEM

CROSS-REFERENCE TO RELATED APPLICATIONS

None

BACKGROUND OF THE INVENTION

The present invention generally relates to power system protection, and more specifically, to an apparatus and method for providing differential protection for a phase angle regulating transformer in a power system.

Electric utility systems or power systems are designed to generate, transmit and distribute electrical energy to loads. In order to accomplish this, power systems generally include a variety of power system elements such as electrical generators, electrical motors, power transformers, power transmission lines, buses and capacitors, to name a few. As a result, power systems must also include protective devices and procedures to protect the power system elements from abnormal conditions such as electrical short circuits, overloads, frequency excursions, voltage fluctuations, and the like.

Protective devices and procedures act to isolate some power system element(s) from the remainder of the power system upon detection of the abnormal condition or a fault in, or related to, the power system element(s). Logically grouped zones of protection, or protection zones utilizing the protective devices and procedures, are established to efficiently manage faults or other abnormal conditions occurring in the power system elements.

In general, protection zones may be classified into six types including: (1) generators and generator-transformer elements (2) transformers, (3) buses, (4) lines (transmission, sub-transmission and distribution), (5) utilization equipment (motors, static loads), and (6) capacitor or reactor banks. Portions of the protection zones typically overlap each other to provide redundancy and to ensure that faults and their locations are properly identified. Thus, each protection zone normally includes protective relays that provide backup for the relays protecting the power system elements of adjacent protection zones. As a result, a variety of protective devices are required. Such protective devices may include different types of protective relays, surge protectors, arc gaps and associated circuit breakers and reclosers.

Although the fundaments of power system protection are similar, each of the six types of protection zones use protective devices that are based on the characteristics of the power system elements in that category. More specifically, different protective relays utilizing a variety of protective schemes (e.g., differential current comparisons, magnitude comparisons, frequency sensing), are required to protect the various power system elements. For example, a differential relay, having nn electrical connections (via current transformers), is designed to monitor current flowing into, for example, a power bus (i.e., a protection zone) by measuring the current flowing into the bus from each terminal to the bus and calculating inter alia, the sum of all measured current, or the operate current. As is known, when the bus is operating under normal conditions, the sum of all of the (primary) currents entering the bus is about zero (Kirchhoff's current law). If the bus has a short circuit, or is faulted, its operate current will be substantially different from zero, indicating that there is some impermissible path through which a current is flowing. If the operate current exceeds some threshold, or pickup current, the differential relay issues a trip signal to an associated power circuit breaker(s) causing it to open and isolate the faulted bus from the remainder of the power system.

Because of potential relay mis-operation, one type of differential relay is designed with a restraint mechanism intended to restrain the differential relay (e.g., prevent it from issuing a trip signal) under certain circumstances. One restraint mechanism includes increasing the pickup current of the current differential relay as the currents entering the protected element increase; in other words, as the restraint current increases, the operate current required to cause a trip increases. Such differential relays are often referred to as percentage-restrained differential relays. For example, Equation (1) illustrates one example of calculating the operate current for a current differential relay that utilizes a restraint mechanism. Alternate schemes may also be used.

$$I_{operate} > k \cdot I_{restraint} \; I_{operate} > \min pu \qquad (1)$$

where $I_{operate} = |I_1 + I_2 + I_3 + \ldots I_n|$ or the phasor sum of currents flowing in the protection zone, and $I_{restraint} = (|I_1| + |I_2| + |I_3| + \ldots |I_n|)/p$ or some measure of the current flowing through the protection zone, and k=constant, min pu=constant, p=constant Thus, the percentage-restraint principle provides security by requiring that the operate current exceeds some percentage of a measure of the current flowing through the protection zone before the differential relay may operate. This requirement that the operate current exceeds a percentage of the restraint current allows the differential relay to tolerate low levels of mismatch in the current measurement at each boundary of the protection zone. The same characteristic also allows the differential relay to tolerate false differential current caused by CT saturation (i.e., where the core becomes saturated, the magnetic flux ceases to change with the primary current and the secondary current is no longer a multiple of the primary current). In addition, because the differential relay operates on the difference current rather than only on the through current in the system, it is highly sensitive.

Differential relays are designed to measure currents no greater than 100 amps via nn electrical connections, and as a result, the differential relays are coupled to the protection zone via a number of current transformers. The current transformers operate to proportionally step-down the primary power system current flowing into the protection zone (while retaining the same phase relation), to a magnitude that can be readily monitored and measured by the differential relay. The resulting lower secondary currents can be filtered, sampled, etc., by the differential relay to determine corresponding phasors representative of the primary current flowing into the protection zone. The phasors are then used in the differential logic scheme (as well as other logic schemes such as an instantaneous overcurrent scheme) of the differential relay. Accordingly, the protection zone is determined by the location of the current transformers that define the differential zone.

Because of their ability to tolerate mismatch in the current measurements, the percentage-retrained differential relays are often used for protection zones that include a power transformer(s). Not all power transformers however operate to step-up or step-down voltage. One type of transformer, a phase angle regulating (PAR) transformer, which is also known as a phase shifting transformer (PST) or "power flow controller", is typically included in the power system to introduce a phase shift between three-phase voltages at two (parallel) buses. These busses are connected by a transmission line to affect the flow of active power by inserting an out-of-phase voltage in series with the voltage of the bus(es), under load. On-load tap changers (LTC) are used to introduce such a phase shift, or out-of-phase voltage. As a result, the relative loading in the line can be changed. A tap changer control mechanism of the PAR transformer monitors the power flow and adjusts the position of the LTC to add or subtract degrees of phase shift to maintain a predetermined set point power flow (e.g., 102 MW).

The PAR transformer may be used to provide the variable (almost linear) phase shift as a function of the LTC position. For example, a delta-hexagonal phase angle regulating (PAR) transformer includes 3 pairs of parallel windings arranged in a hexagonal shape, where each pair corresponds to a phase, and where a 1:1 voltage is maintained while the phase shift is varied via the LTCs. Each pair includes one tapped winding with two load tap changers, and one untapped winding. The two LTCs vary phase shift by moving transformer input (Source) terminals (S1, S2, S3) and output (Load) terminals (L1, L2, L3) symmetrically with respect to the middle tap to cause the output voltages $V_{L1}, V_{L2}, V_{L3}$ to lead or lag the input voltages $V_{S1}, V_{S2}, V_{S3}$ by up to 32.9 degrees. Other types of PAR transformers include delta secondary winding/grounded wye exciting windings connections, wye secondary series winding/delta primary exciting winding connections, and tapped series winding design, to name a few.

As noted above, differential elements are often used to provide power transformer protection. Unfortunately, unlike application to typical power transformers, application of differential elements to PAR transformers is often difficult due to the continuously variable phase angles of the measured currents between the source- and load-side of the PAR transformer. In fact, a small difference in phase angle may translate into a large operate current thereby rendering the differential relay unsuitable for its intended application.

Traditional methods of addressing the fixed phase shift across a transformer have included combining currents in the differential circuit to mimic combinations of currents in the transformer. With the PAR transformer however, the amount of current contributed from the (two) other phases and combined into each phase varies with its associated tap position. Thus, under external (through-fault) conditions, the currents entering and exiting the transformer cannot be easily balanced thereby causing the differential elements to incorrectly trip for an external fault. Thus, traditional transformer differential protection cannot be effectively applied to a PAR transformer.

SUMMARY OF THE INVENTION

In general, an apparatus and method is provided in a protective device to compensate for a phase shift introduced by operation of the PAR transformer in order to allow application of differential protection to the PAR transformer by the protective device.

In accordance with an aspect of the invention, provided is an apparatus for providing differential protection for a phase angle regulating transformer having a load side and a source side in a three-phase power system. The apparatus includes a microcontroller having a microprocessor, a memory operatively coupled to the microprocessor, a positive sequence differential element and a negative sequence differential element. The microprocessor is adapted to calculate a first positive sequence component and a first negative sequence component associated with incoming secondary currents detected on the source side, to calculate a second positive sequence component and a second negative sequence component associated with outgoing secondary currents detected on the load side, to apply a phase angle shift to the second positive sequence component and the second negative sequence component to form a compensated positive sequence component and a compensated negative sequence component, respectively, and to determine an operate current value and a restraint current value for each of the positive and negative sequence differential elements based on the compensated positive sequence component and the compensated negative sequence component. The phase angle shift is introduced by operation of the phase angle regulating transformer.

In accordance with another aspect of the invention, provided is a method for providing differential protection for a phase angle regulating transformer having a load side and a source side in a three-phase power system, the differential protection including a positive sequence differential element and a negative sequence differential element. The method includes deriving a first set of three phasors from incoming secondary currents detected on the source side and deriving a second set of three phasors from outgoing secondary currents detected on the load side. The method also includes calculating a first positive sequence component and a first negative sequence component based on the first set of three phasors, and calculating a second positive sequence component and a second negative sequence component based on the second set of three phasors. The method further includes determining a phase angle shift based on a tap position of at least one tap changer and a predetermined number of degrees per step of the phase angle regulating transformer, applying the phase angle shift to the second positive sequence component and the second negative sequence component to generate a compensated positive sequence component and a compensated negative sequence component, respectively, and determining an operate current value and a restraint current value for each of the positive and negative sequence differential elements based on the compensated positive sequence component and the compensated negative sequence component. The phase angle shift is introduced by operation of the phase angle regulating transformer.

In accordance with yet another aspect of the invention, provided is a method for providing differential protection for a phase angle regulating transformer having a load side and a source side in a three-phase power system. The method includes calculating a first positive sequence component and a first negative sequence component associated with incoming secondary currents detected on the source side, calculating a second positive sequence component and a second negative sequence component associated with outgoing secondary currents detected on the load side, applying a phase angle shift to the second positive sequence component and the second negative sequence component to form a compensated positive sequence component and a compensated negative sequence component, respectively, and determining an operate current value and a restraint current value for each of a positive and negative sequence differential element based on the compensated positive sequence component and the compensated negative sequence component. The phase angle shift is introduced by operation of the phase angle regulating transformer.

It should be understood that the present invention includes a number of different aspects and/or features which may have utility alone and/or in combination with other aspects or features. Accordingly, this summary is not an exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

DETAILED DESCRIPTION OF THE INVENTION

An apparatus and method is provided in a protective device to compensate for a phase shift introduced by operation of the PAR transformer, operatively coupled to the protective device, in order to allow application of current differential protection to the PAR transformer.

For ease of discussion, aspects of the present invention can be more fully understood by limiting the detailed discussion to a protection zone that includes one phase angle regulating transformer monitored by a differential relay, coupled to the protection zone via a number nn of current transformers. Such a protection zone is defined herein to include the A-phase, B-phase and C-phase primary currents flowing into the phase angle regulating transformer at each terminal. Further, the apparatus and methods disclosed herein are also applicable to other power system devices such as lines and power transformers.

Figure 1:
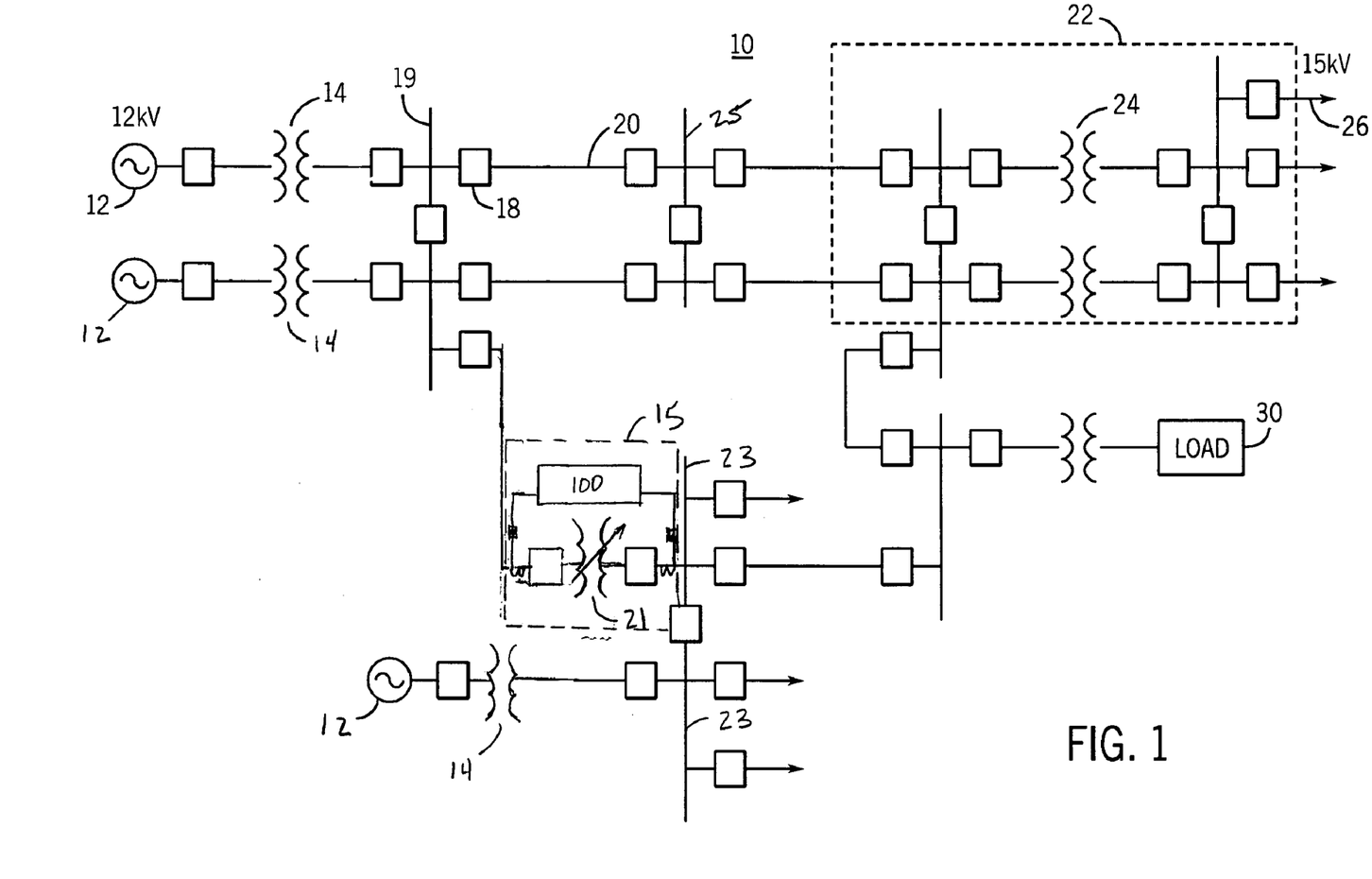
FIG. 1 is a single line schematic diagram of a power system that may be utilized in a typical wide area.

FIG. 1 is a single line schematic diagram of a power system 10 that may be utilized in a typical wide area. As illustrated in FIG. 1, the power system 10 includes, among other things, three generators 12 configured to generate three-phase sinusoidal waveforms, for example, three-phase 12 kV sinusoidal waveforms, three step-up power transformers 14 configured to increase the 12 kV sinusoidal waveforms to a higher voltage such as 138 kV and a number of circuit breakers 18. The step-up power transformers 14 provide the higher voltage sinusoidal waveforms to a number of long distance transmission lines such as the transmission lines 20. In an embodiment, a first substation may be defined to include two of the generators 12, two of the step-up transformers 14 and associated circuit breakers 18 interconnected via a first bus 19. As illustrated, the transmission lines 20 provide power to a number of buses, such as a bus 23 and a bus 25, enabling distribution of the power to various end-users 26 and loads 30. At the end of the long distance transmission lines 20, a second substation 22 includes step-down power transformers 24 to transform the higher voltage sinusoidal waveforms to lower voltage sinusoidal waveforms (e.g., 15 kV) suitable for distribution via a distribution line to the end-users 26 and loads 30.

A phase angle regulating (PAR) transformer 21, rated at, for example, 150 MVA and 138 kV, is also included in the power system 10 to introduce a phase shift between three-phase voltages on the bus 19 and the terminals of the transmission line 20 connecting bus 19 to bus 23. This phase shift is required to increase or decrease the power flow along that path of the transmission system.

As previously mentioned, the power system 10 includes protective devices and procedures to protect the power system elements from faults or other abnormal conditions The protective devices and procedures utilize a variety of protective logic schemes to determine whether a fault or other problem exists in the power system 10. For example, some types of protective relays utilize a current differential comparison to determine whether a fault exists in the protection zone. Other types of protective relays compare the magnitudes of calculated phasors, representative of the power system sinusoidal waveforms, to determine whether a fault exists in the protection zone. Frequency sensing techniques and harmonic content detection is also incorporated in protective relays to detect fault conditions. Similarly, thermal model schemes are utilized by protective relays to determine whether a thermal problem exists in the protection zone.

Referring again to FIG. 1, a protection zone 15 (see, FIG. 2) is established to include the PAR transformer 21. A protective relay, for example a differential relay 100, is coupled to the protection zone 15 via a number of current transformers. Although two current transformers are illustrated coupling the differential relay 100 to the protection zone 15, more or less current transformers and/or voltage transformers may be utilized, depending on the configuration and included protective elements (e.g., an instantaneous overcurrent element, an AC time overcurrent element, a differential protection element) of the differential relay 100.

Figure 2:
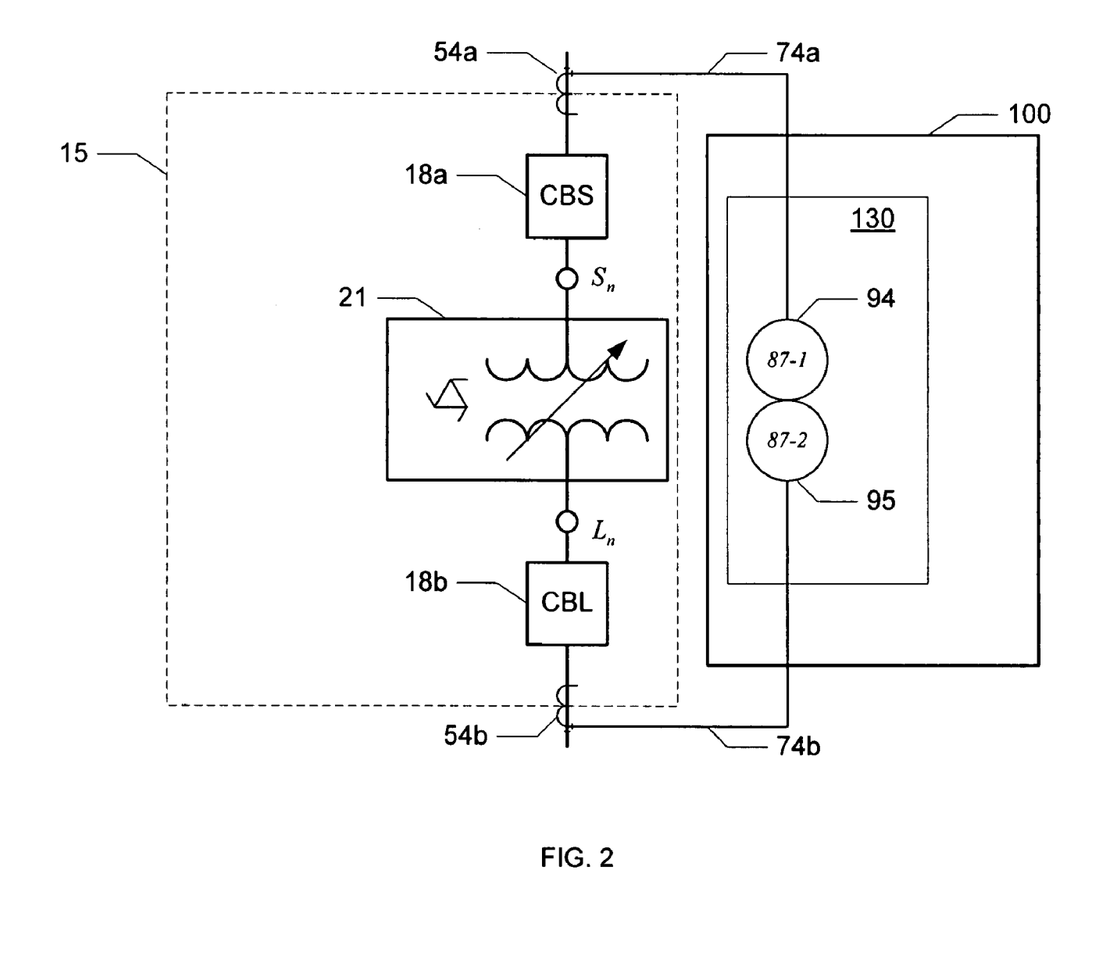
FIG. 2 is a block diagram of a differential relay coupled to a protection zone including the phase angle regulating transformer of FIG. 1, according to an embodiment of the invention.

FIG. 2 is a block diagram of the differential relay 100 coupled to the protection zone 15 for purposes of providing protection for the PAR transformer 21, according to an embodiment of the invention. As discussed below, protection for the PAR transformer is provided by inter alia a positive sequence differential element 94 and a negative sequence differential element 95 that may be enabled via programmable logic, software routines, etc. Further, in the illustrated example, the differential relay 100 is configured to operate for internal faults, not for load or external faults. Although only one protection zone 15 is illustrated, the power system 10 may include many overlapping protection zones (e.g., Zone 1, Zone 2 . . . Zone mm).

Referring to the single line nature of FIGS. 1 and 2, the differential relay 100 is coupled to the protection zone 15 via nn current transformers illustrated as current transformers 54a and 54b. It should be noted however that the differential relay 100 is adapted to monitor the A-phase, B-phase and C-phase primary currents flowing into the protection zone 15 and is therefore coupled to the protection zone via at least four more current transformers; two for the B-phase and two for the C-phase. In addition, although illustrated using the differential relay 100, it should be understood that other types of protective devices may be utilized to implement the apparatus and methods disclosed herein.

As previously noted, the protection zone 15 may be defined such that the differential relay 100 utilizes each of the A-phase, B-phase and C-phase secondary current waveforms provided by respective current transformers. Thus, each of the current transformers 54a and 54b is configured to step-down the current magnitudes of respective A-phase primary current waveforms to corresponding secondary current waveforms 74a (on the source side of the PAR transformer 21) and 74b (on the load side of the PAR transformer 21), having magnitudes suitable for use by the current differential relay 100. Similarly, although not separately shown in FIG. 2, current transformers 55a and 55b are configured to step-down the current magnitudes of respective B-phase primary current waveforms to corresponding secondary current waveforms 75a and 75b, and current transformers 56a and 56b are configured to step-down the current magnitudes of respective C-phase primary current waveforms to corresponding secondary current waveforms 76a through 76b having magnitudes suitable for use by the differential relay 100 (see, FIG. 4).

In general, the differential relay 100 processes the secondary current waveforms 74a-74b, 75a-75b and 76a-76b received via respective current transformers 54a-54b, 55a-55b, and 56a-56b. The secondary current waveforms 74a-74b, 75a-75b and 76a-76b are transformed, filtered, sampled and then digitized for use by a microprocessor (or FPGA) of the differential relay 100. The microprocessor then calculates a series of phasors, each having a magnitude and phase angle that are representative of each of the A-phase, B-phase and C-phase primary current waveforms, and then performs calculations to determine if a fault exists in the protection zone 15.

Figure 3:
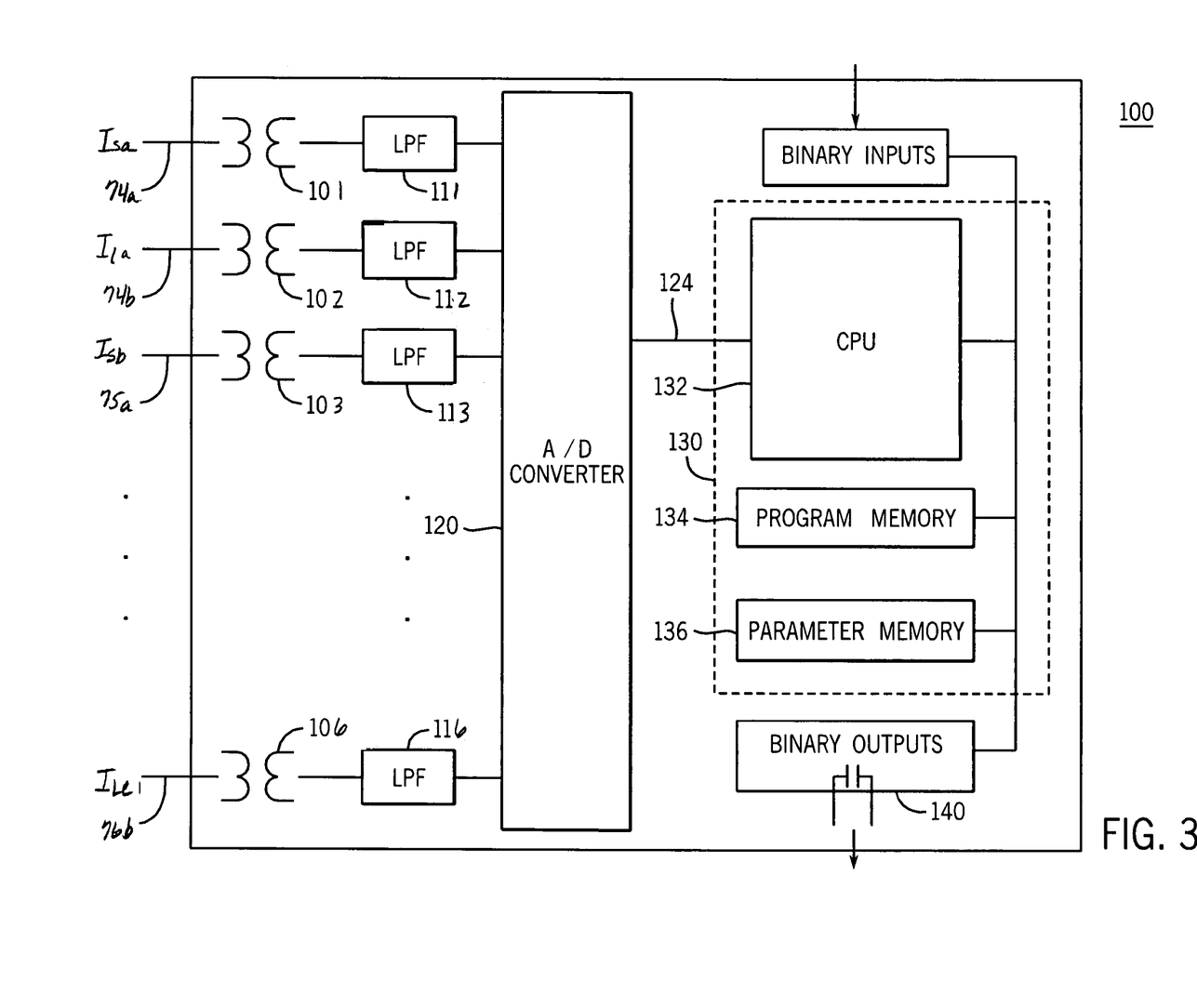
FIG. 3 is a block diagram of an exemplary configuration of the differential relay of FIG. 2.

For example, FIG. 3 is a block diagram of an exemplary configuration of the differential relay 100 of FIG. 2 where the secondary current waveforms 74a-74b, 75a and 76b are illustrated as $I_{sa}$, $I_{la}$, $I_{sb}$, $I_{lc}$. Although only secondary current waveforms 74a-74b, 75a and 76b are shown in FIG. 3, it should be noted that all secondary current waveforms resulting from operation of the current transformers coupling the differential relay 100 to the protection zone 15, are received and processed by the differential relay 100.

Referring to FIG. 3, during operation, the secondary current waveforms 74a-74b, 75a-75b and 76a-76b received by the differential relay 100 are further transformed into corresponding voltage waveforms via respective current transformers 101-106 and resistors (not separately illustrated), and filtered via respective analog low pass filters 111-116. An analog-to-digital (A/D) converter 120 then multiplexes, samples and digitizes the filtered secondary current waveforms to form corresponding digitized current sample streams (e.g., 1011001010001111).

The corresponding digitized current sample streams are received by a microcontroller 130, where they are digitally filtered via, for example, a Cosine filter to eliminate DC and unwanted harmonic frequency components. In an embodiment, the microcontroller 130 includes a microprocessor, or CPU 132, a program memory 134 (e.g., a Flash EPROM) and a parameter memory 136 (e.g., an EEPROM). As will be appreciated by those skilled in the art, other suitable microcontroller configurations (or FPGA configurations) may be utilized.

As is known, for a balanced power system with an A-, B-, C-phase sequence, each of the phasors derived from the three secondary currents on the source- and load-side of the PAR transformer 21 is of equal magnitude and has a phase shift of 120 degrees. For example, when expressed as complex numbers or phasors, $I_a = 1\angle 0°$, $I_b = 1\angle -120°$, and $I_c = 1\angle 120°$, under "balanced" conditions, the three phasors rotate counterclockwise. By convention, the "positive" sequence (the order in which phasors appear when passing a fixed point) is sequence $I_a$, $I_b$, $I_c$, and the "negative" sequence is sequence $I_a$, $I_c$, $I_b$. A balanced power system with an A-, C-, B-phase sequence is also possible. For such power systems, the conventions for positive and negative sequence are reversed from those of an A-, B-, C-phase sequence power system.

As is also known, a fault condition (e.g., a transformer winding short circuit) typically results in an "unbalanced" condition yielding, for example, A-, B- and C-current phasors having varied magnitudes with phase angles that are not 120 degrees apart. When presented with such a fault condition, the microcontroller 130 executing its protective scheme, (1) decomposes the unbalanced currents into one three-phase balanced set of phasors with positive sequence rotation, one three-phase balanced set of phasors having negative sequence rotation and one three-phase balanced set of three phasors that are in phase (i.e., the "zero" sequence), and (2) performs protective calculations. Decomposing the unbalanced currents into positive-, negative- and zero-sequence phasor sets facilitates calculations in polar form where multiplication of two phasors simply requires multiplication of their magnitudes and addition of their phase angles. It should be noted that the calculations discussed below are performed using phasors in their polar form.

Referring again to FIG. 3, the microprocessor 132 executing a computer program, protection algorithm or relay logic scheme (discussed below in connection with FIG. 4) processes each of the digitized current sample streams to extract phasors representative of their corresponding A-, B-, and C-phase primary current waveforms 54a-54b, 55a-55b and 56a-56b, and then performs various calculations using the phasors to determine whether a fault (e.g., a short circuit) exists in the protection zone 15. If a fault is detected, the microcontroller 130 will subsequently cause binary output contacts 140 to be closed thereby opening an associated power circuit breaker (e.g., the circuit breaker 18) to isolate the portion of the protection zone 15 experiencing the fault from the remainder of the power system.

Figure 4:
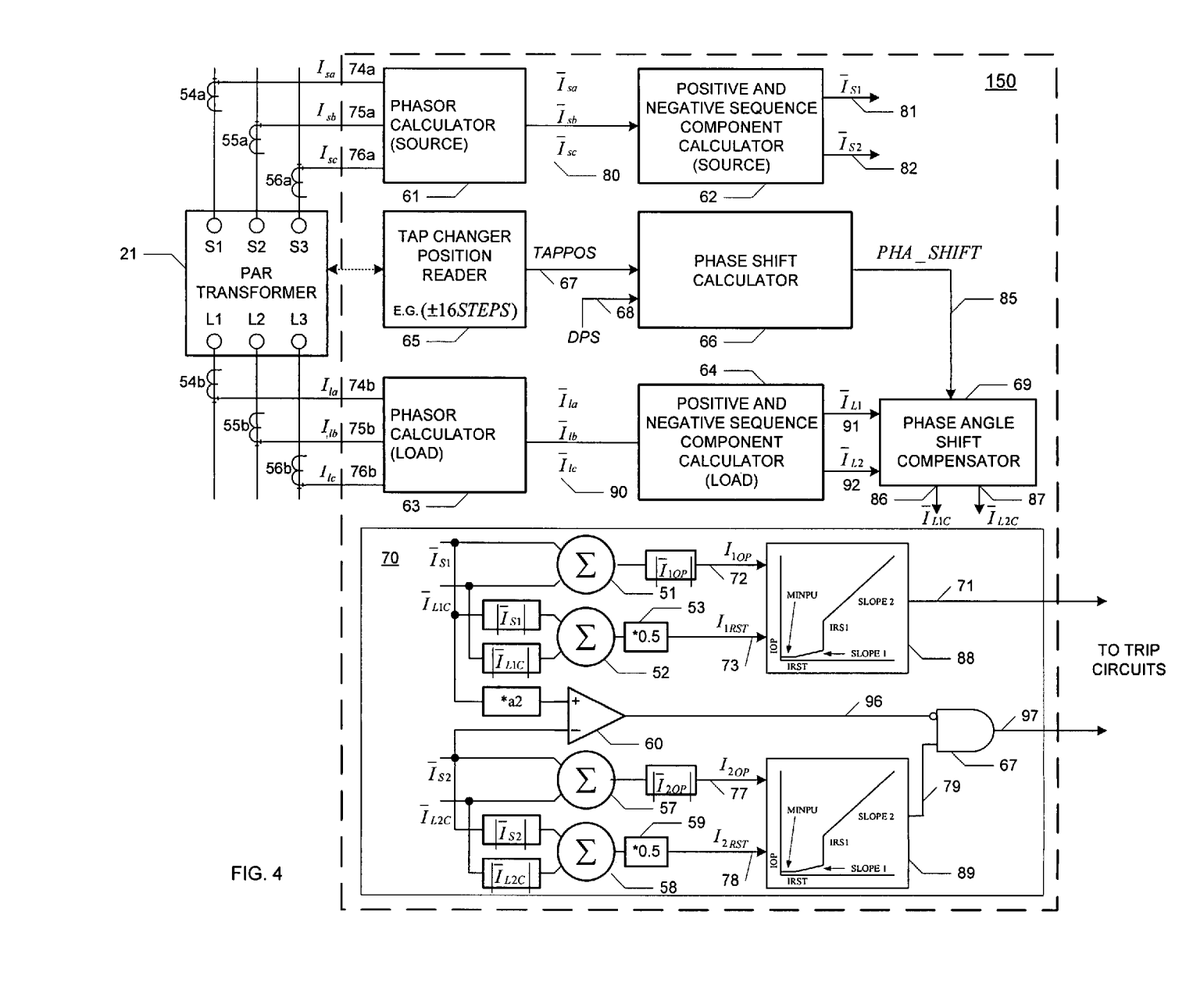
FIG. 4 is a functional block diagram illustrating a method for providing differential protection for the phase angle regulating transformer of FIG. 2, according to an embodiment of invention.

The microcontroller 130 is also configured to compensate for a phase shift introduced by operation of the PAR transformer 21 to enable application of differential protection to the PAR transformer, according to an embodiment of the invention. FIG. 4 is an exemplary functional block diagram of an apparatus 150 for providing differential protection for the phase angle regulating transformer 21 in the protection zone 15, according to an embodiment of the invention. Although discussed in terms of an exemplary functional block diagram for illustrative purposes, it should be appreciated by one skilled in the art that the differential protection for the phase angle regulating transformer 21 disclosed herein may be provided via the microcontroller 130 executing a computer program, protection algorithm or relay logic scheme, without departing from the invention.

Referring to FIG. 4, the apparatus 150 includes a first phasor calculator 61 adapted to extract a first set of phasors 80 ($I_{sa}$, $I_{sb}$, $I_{sc}$) from the source-side secondary current waveforms 74a, 75a and 76a, and a second phasor calculator 63 adapted to extract a second set of phasors 90 ($I_{la}$, $I_{lb}$, $I_{lc}$) from the load-side secondary current waveforms 74b, 75b and 76b. Also included is a first sequence component calculator 62 adapted to calculate a magnitude and a phase angle of a source-side positive sequence symmetrical component, or a first positive sequence component $I_{S1}$ 81 and to calculate a magnitude and a phase angle of a source-side negative sequence symmetrical component, or a first negative sequence component $\bar{I}_{S2}$ 82 based on the first set of phasors 80. Similarly included is a second sequence component calculator 64 adapted to calculate a magnitude and a phase angle of a load-side positive sequence symmetrical component, or a second positive sequence component $\bar{I}_{L1}$ 91 and to calculate a magnitude and a phase angle of a load-side negative sequence symmetrical component, or a second negative sequence component $\bar{I}_{L2}$ 92 based on the second set of phasors 90.

As described in connection with FIG. 3, each of the first positive and negative sequence components 81 and 82, and each of the second positive and negative sequence components 91 and 92 is a set of balanced currents that are extracted from unbalanced currents. In addition, the phase shift of the first negative sequence component 82 and the second negative sequence component 92 across the PAR transformer 21 is opposite that of the first positive sequence component 81 and the second positive sequence component 91. Further, the positive sequence differential element 94 is responsive to all fault types. Conversely, the negative sequence differential element 95 is responsive to unbalanced fault types and provides higher sensitivity than the positive sequence element 94.

Figure 5:
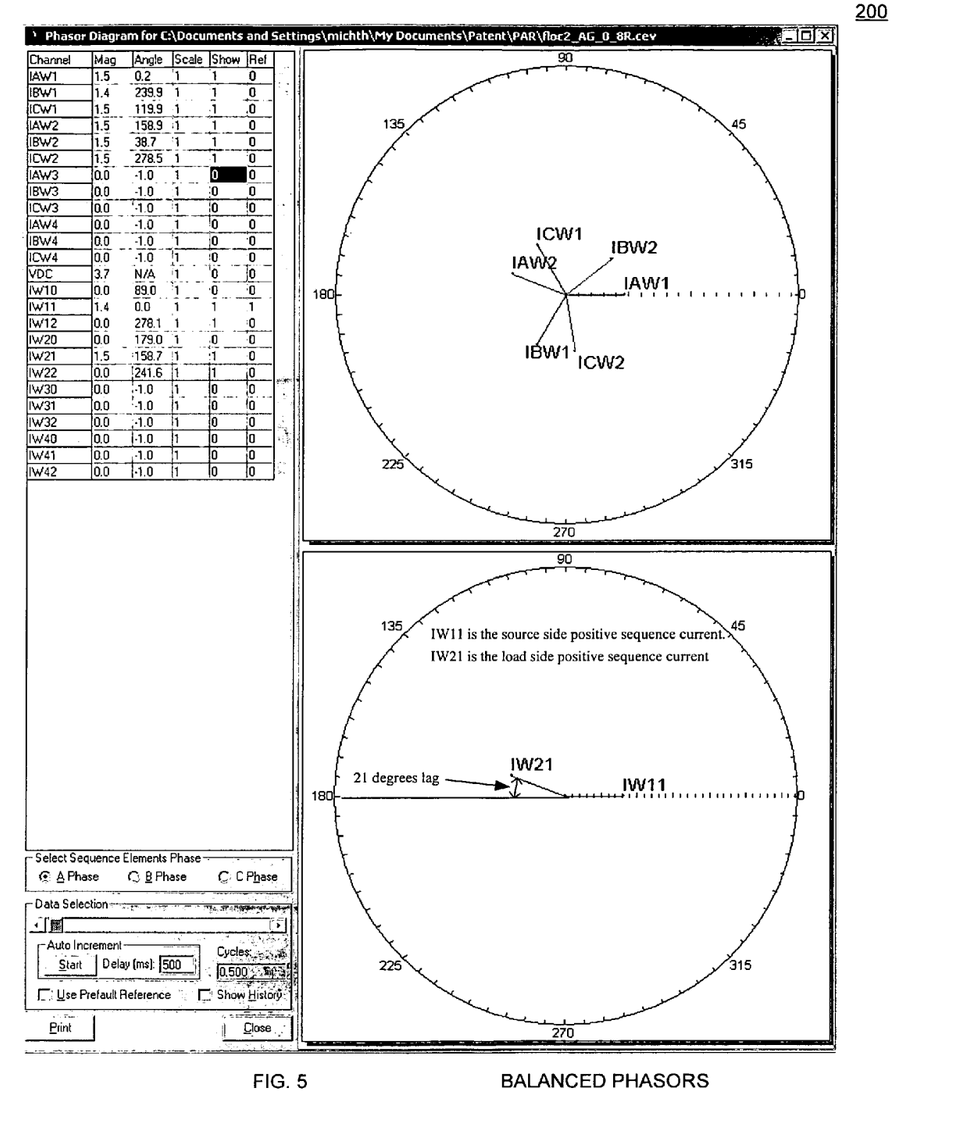
FIG. 5 is an exemplary phasor diagram illustrating balanced current flowing through the phase angle regulating transformer of FIG. 1.

For example, FIG. 5 is an exemplary phasor diagram 200, generated by a recording device, illustrating balanced current flowing through the PAR transformer 21 during balanced current flow. As illustrated in FIG. 5 (and FIG. 6 below) it should be noted that the current measurements represent current into the protection zone 15. For load flow through the protection zone 15, the currents on the load side will be offset from the current on the source side by 180 degrees in addition to the phase shift introduced by operation of the PAR transformer. As shown in FIG. 5, under balanced conditions, the six phasors resulting from PAR transformer operation (see, top diagram) can be combined to yield first and second positive sequence components (see, bottom diagram), where source-side secondary current waveforms 74a, 75a and 76a are labeled IAW1, IBW1 and ICW1, the load-side secondary current waveforms 74b, 75b and 76b are labeled IAW2, IBW2 and ICW2, and the first and second positive sequence components 81 and 91 are labeled IW11 and IW21. In this case, operation of the PAR transformer 21 causes the second positive sequence component 91 to lag its associated first positive sequence component 81 by 21 degrees.

Figure 6:
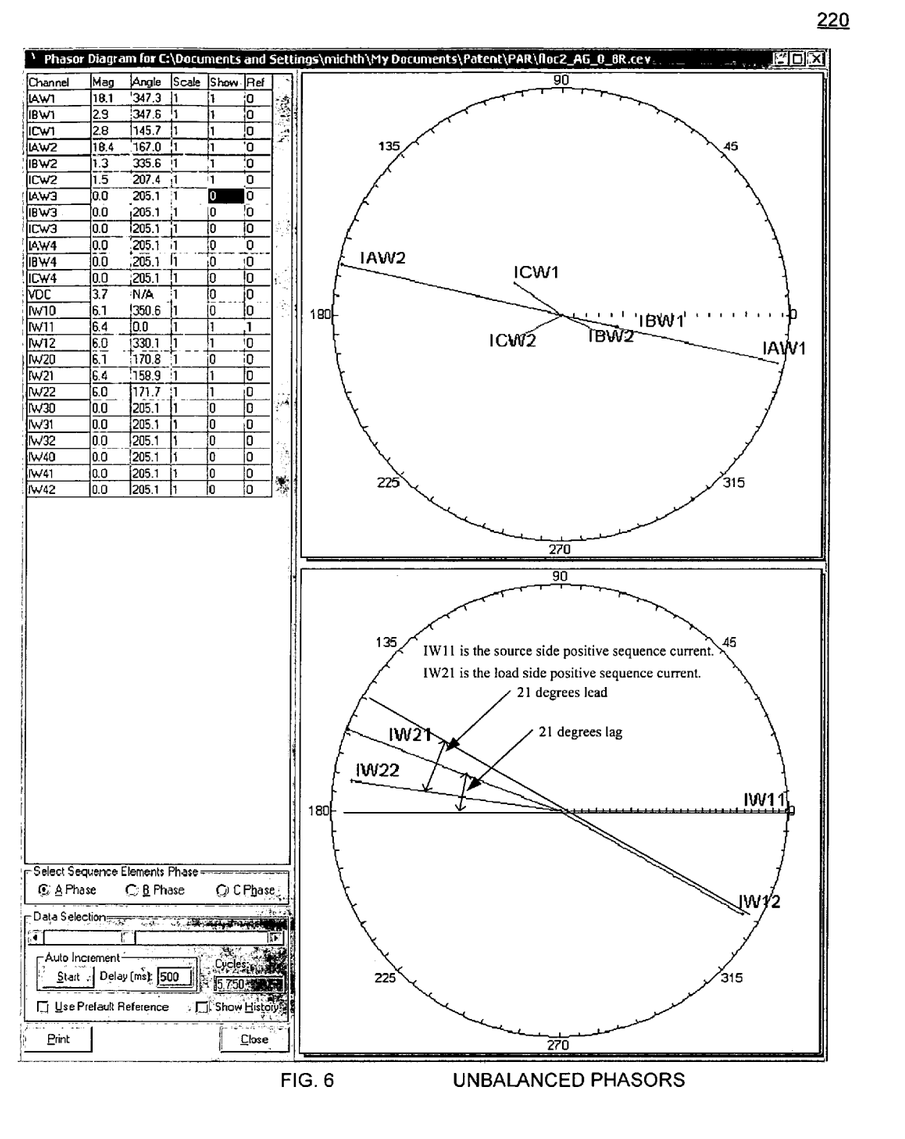
FIG. 6 is an exemplary phasor diagram illustrating unbalanced current flowing through the phase angle regulating transformer during an A-phase-to-ground fault.

Conversely, FIG. 6 is an exemplary phasor diagram 220, generated by a recording device, illustrating unbalanced current flowing through the PAR transformer 21 during an A-phase-to-ground fault. As shown in FIG. 6, under unbalanced conditions, the six phasors resulting from PAR transformer 21 operation can be combined to yield first and second positive sequence components and first and second negative sequence components, where the source-side secondary current waveforms 74a, 75a and 76a are labeled IAW1, IBW1 and ICW1, the load-side secondary current waveforms 74b, 75b and 76b are labeled IAW2, IBW2 and ICW2, the first and second positive sequence components 81 and 91 are labeled IW11 and IW21, and the first and second negative sequence components 82 and 92 are labeled IW12 and IW22. In this case, operation of the PAR transformer 21 causes the second positive sequence component 91 to lag the first positive sequence component 81 by 21 degrees and the second negative sequence component 92 is offset from the first negative sequence component 82 by 21 degrees, in the leading direction.

Referring again to FIG. 4, the apparatus 150 additionally includes a phase shift calculator 66 adapted to calculate a phase angle shift PHA_SHIFT 85 based on a tap changer position TAPPOS 67 of the PAR transformer 21, and a predetermined number of degrees per step DPS 68. As noted above, for each of the three phases, the PAR transformer 21 may include a first tap changer associated with the source-side terminal of the PAR transformer 21 (e.g., A-phase PAR transformer input terminal), and a second tap changer associated with a load-side terminal of the PAR transformer 21 (e.g., A-phase PAR transformer output terminal). For each phase, positioning the first and second tap changers to insert or delete steps with respect to a middle tap causes the load side voltage to lag or lead the source side voltage up to a predetermined maximum (e.g., 32.9 degrees). Accordingly, if each of the three tapped windings include +/−16 steps where each step is equal to 2.06 degrees, and there are two tap changers selecting taps on each of the three tapped windings, the difference in tap position between the two taps changers determines the number of degrees phase shift across the PAR transformer 21.

For example, if the tap position of the first tap changer on the source terminals is one step in the advance direction from the middle tap and the tap position of the second tap changer on the load terminals is one step in the retard direction from the middle tap, the difference in taps selected between the source and load terminals is two steps retard which will result in the load-side current lagging the, source-side current by 4.12 degrees. It should be noted that although illustrated using a PAR transformer with six tap changers, the apparatus and method disclosed herein is applicable to PAR transformers having other configurations.

Referring again to FIG. 4, the apparatus 150 further includes a phase angle shift compensator 69 adapted to apply the phase angle shift PHA_SHIFT 85 to the second positive sequence component $\bar{I}_{L1}$ 91 to form a compensated positive sequence symmetrical component $\bar{I}_{L1C}$ 86 where $\bar{I}_{L1C}=\bar{I}_{L1}*1\angle-\text{PHA\_SHIFT}$. Accordingly, the second positive sequence component $\bar{I}_{L1}$ 91 is multiplied by a first compensating phasor $1\angle-\text{PHA\_SHIFT}$ having a magnitude of one and phase angle opposite that of the second positive sequence component $\bar{I}_{L1}$ 91 to yield the compensated positive sequence symmetrical component $\bar{I}_{L1C}$ 86 having a phase angle of 180, thereby operatively eliminating the phase shift of the second positive sequence component $\bar{I}_{L1}$ 91. The phase angle shift compensator 69 also applies the phase angle shift PHA_SHIFT 85 to the second negative sequence component $\bar{I}_{L2}$ 92 to form a compensated negative sequence component $\bar{I}_{L2C}$ 87 where $\bar{I}_{L2C}=\bar{I}_{L2}*1\angle+\text{PHA\_SHIFT}$. Accordingly, the second negative sequence component $\bar{I}_{L2}$ 92 is multiplied by a second compensating phasor $1\angle+\text{PHA\_SHIFT}$ having a magnitude of one and phase angle opposite that of the second negative sequence component $\bar{I}_{L2}$ 92 to yield the compensated negative sequence symmetrical component $\bar{I}_{L2C}$ 87 having a phase angle of zero, thereby operatively eliminating the phase shift of the second negative sequence component $\bar{I}_{L2}$ 92.

Additionally included in the apparatus 150 is a current calculator 70. Based on the first positive sequence component $\bar{I}_{S1}$ 81 and the compensated positive sequence component $\bar{I}_{L1C}$ 86, and based on the first negative sequence component $\bar{I}_{S2}$ 82 and the compensated negative sequence component $\bar{I}_{L2C}$ 87, respectively, the current calculator 70 is adapted to calculate the (analog) operate and restraint current values used to determine binary outputs utilized by the positive and negative sequence differential current elements 94 and 95.

In the illustrated example, the absolute value of a sum of the first positive sequence component $\bar{I}_{S1}$ 81 and the compensated positive sequence component $\bar{I}_{L1C}$ 86 yields the positive sequence operate current value $I_{1OP}$ 72, and the average of an absolute value of the first positive sequence component $\bar{I}_{S1}$ 81 and the absolute value of the compensated positive sequence component $\bar{I}_{L1C}$ 86 yields the positive sequence restraint current value $I_{1RST}$ 73. Thus, the positive sequence restraint current value $I_{1RST}$ 73 is the average magnitude of the incoming source- and outgoing load-side currents.

A comparison of the positive sequence operate current value $I_{1OP}$ 72 and the positive sequence restraint current value $I_{1RST}$ 73 to a positive sequence dual slope differential element characteristic 88 of the positive sequential differential element 94 yields a first binary output 71 having either a first or second logic value. The logic value of first binary output 71 is determinative of whether a trip condition exists that requires an associated circuit breaker(s) 18 to open and isolate the PAR transformer 21 from the power system 10. For example, if the positive sequence operate current value $I_{1OP}$ 72 exceeds a percentage of the positive sequence restraint current value $I_{1RST}$ 73 (as determined by the positive sequence dual slope differential element characteristic 88), the first binary output 71 having a first logic value (e.g., a logic 1) will cause the trip signal to be issued.

For ease of illustration, the positive sequence dual slope differential element characteristic 88 of the positive sequential differential element 94 is depicted as a graph, where the Y-axis represents the operate quantity, the X-axis represents the restraint quantity and the quantities are plotted in per unit of tap. A characteristic line of the graph represents a trip characteristic. The region above the characteristic line may be referred to as the operating, or trip, region while the region below the characteristic line may be referred to as the restraining region.

The graph represents the various characteristics that must be present before a trip condition is satisfied. For example, to indicate the trip condition, the positive sequence operate current value $I_{1OP}$ 72 must exceed the minimum pick-up value (above the min pu line). The gradual slope of the characteristic labeled Slope 1 of the characteristic line: indicates that at lower current levels where current transformer performance is likely to be linear, the emphasis is on sensitivity to low-level faults. If the positive sequence restraint current value $I_{1RST}$ 73 is higher than the IRS1 line, Slope 2 of the graph line provides increased restraint at higher current levels. As a result, the operate current must exceed a certain percentage of the restraint current for a trip to occur, and undesired differential relay operation is prevented when unbalances occur between the current transformers during external faults. Thus, in an embodiment, if the ratio of the instantaneous measured positive sequence operate current value $I_{1OP}$ 72 and the instantaneous measured positive sequence restraint current value $I_{1RST}$ 73 falls above the characteristic line, the output to the positive sequence differential element 94 is a logic one, and if the instantaneous measured positive sequence operate current value $I_{1OP}$ 72 and the instantaneous measured positive sequence restraint current value $I_{1RST}$ 73 falls below the characteristic line, the output to the positive sequence differential element 94 is a logic zero. It should be noted that the dual slope characteristic illustrated in FIG. 4 is one of any number of suitable types of dual slope characteristics that may be utilized by the positive sequential differential element 94.

Similarly, the absolute value of a sum of the first negative sequence component $\bar{I}_{S2}$ 82 and the compensated negative sequence component $\bar{I}_{L2C}$ 87 yields the negative sequence operate current value $I_{2OP}$ 77, and the average of the absolute value of the first negative sequence component $\bar{I}_{S2}$ 82 and the absolute value of the compensated negative sequence component $\bar{I}_{L2C}$ 87 yields the negative sequence restraint current value $I_{2RST}$ 78. Thus, the negative sequence restraint current value $I_{2RST}$ 78 is the average magnitude of the incoming source- and outgoing load-side currents.

A comparison of the negative sequence operate current value $I_{2OP}$ 77 and the negative sequence restraint current value $I_{2RST}$ 78 to a negative sequence dual slope differential element characteristic 89 of the negative sequential differential element 95 yields a second binary output 79 having either the first or second logic value. Unlike the first binary output 71 resulting from the comparison of the positive sequence dual slope differential element characteristic 88, the second binary output 79 is not directly used by its corresponding differential element 95. Rather, the magnitude of the first negative sequence component $\bar{I}_{S2}$ 82 is compared to a predetermined percentage *a2 of the magnitude of the first positive sequence component $\bar{I}_{S1}$ 81 to yield a third binary output 96. If the magnitude of the first negative sequence component $\bar{I}_{S2}$ 82 exceeds the percentage *a2 of the magnitude of the first positive sequence component $\bar{I}_{S1}$ 81 (e.g., the third binary output 96 has a logic low value), then a first logic value of the second binary output 79 is utilized by the negative sequence differential current element 95 as a fourth binary output 97 to indicate a trip condition. In the illustrated example, the predetermined percentage *a2 is 10 percent however other values for the predetermined percentage *a2 are possible.

The step of ensuring that the magnitude of the first negative sequence component $\bar{I}_{S2}$ 82 is, for example, at least 10 percent of the magnitude of the first positive sequence component $\bar{I}_{S1}$ 81 prior to allowing the first logic value of the second binary output 79 to be utilized to indicate a trip condition, provides assurance that the first and second negative sequence components 82 and 92 likely result from an internal fault rather than from other factors causing unbalanced system conditions (e.g., measuring errors).

As may be apparent from the above discussion and figures, the system and method disclosed herein enables the phase angle of the load-side currents to be shifted by an amount opposite the phase shift introduced by the PAR transformer 21 to realign the load currents so that they are opposite and cancel each other out for flow through the PAR transformer 21. The negative sequence component of the load current is shifted by an amount equal and opposite to the phase shift for the positive sequence component of the load current. As a result, for any condition of phase shift and/or balanced or unbalanced current flow through the PAR transformer 21, the currents are always compensated so that they balance for purposes of calculating the operate and restraint currents. Similarly, the positive sequence component of the source current could be multiplied by one at a phase angle equal to the phase shift and the negative sequence component of the source current could be multiplied by one at an angle opposite to the phase shift. For any faults occurring in the protection zone 15, the sequence component differential elements will not be balanced and the PAR transformer 21 will be isolated from the power system 10.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. An apparatus for providing differential protection for a transformer having a load side and a source side in a three-phase power system, the apparatus comprising:
   a microcontroller including a microprocessor, a memory operatively coupled to the microprocessor, a positive sequence differential element and a negative sequence differential element, the microprocessor adapted to:
   calculate a first positive sequence component and a first negative sequence component associated with incoming secondary currents detected on the source side, and calculate a second positive sequence component and a second negative sequence component associated with outgoing secondary currents detected on the load side;
   apply a phase angle shift to the second positive sequence component and the second negative sequence component to form a compensated positive sequence component and a compensated negative sequence component, respectively, to compensate for a phase angle shift introduced by operation of the transformer; and
   determine an operate current value and a restraint current value for each of the positive and negative sequence differential elements based on the compensated positive sequence component and the compensated negative sequence component.

2. The apparatus of claim 1, wherein the first positive sequence component and the first negative sequence component are derived from a first set of three phasors extracted from the incoming secondary currents, and wherein the second positive sequence component and the second negative sequence component are derived from a second set of three phasors extracted from the outgoing secondary currents.

3. The apparatus of claim 1, wherein the applied phase angle shift is based on a tap position of at least one tap changer and a predetermined number of degrees per step of the transformer.

4. The apparatus of claim 3, wherein the microprocessor is further adapted to:
   determine a number of steps from a reference position based on the tap position, the tap position adjustable to maintain a set point power flow in the three-phase power system; and
   multiply the number of steps by the predetermined number of degrees to yield the phase angle shift.

5. The apparatus of claim 1, wherein the microprocessor is further adapted to:
   multiply the second positive sequence component by a first compensating phasor to form the compensated positive sequence component, the first compensating phasor having a magnitude equal to one and a first phase angle opposite that of the phase angle shift; and
   multiply the second negative sequence component by a second compensating phasor to form the compensated negative sequence component, the second compensating phasor having a magnitude equal to one and a second phase angle substantially equal to the phase angle shift.

6. The apparatus of claim 1, wherein the microprocessor is further adapted to:
   calculate an absolute value of a sum of the first positive sequence component and the compensated positive sequence component to form a positive sequence operating current value;
   calculate an average of an absolute value of the first positive sequence component and an absolute value of the compensated positive sequence component to form a positive sequence restraint current value; and
   compare the positive sequence operating current value and the positive sequence restraint current value to a first dual slope differential element characteristic to form a first binary output, the first binary output utilized to indicate a trip condition.

7. The apparatus of claim 6, wherein the first binary output indicates the trip condition when the positive sequence operating current value to the positive sequence restraint current value is above a characteristic line of the first dual slope differential element characteristic, and wherein the first binary output indicates a no-trip condition when the positive sequence operating current value to the positive sequence restraint current value is below the characteristic line of the first dual slope differential element characteristic.

8. The method of claim 1, wherein the microprocessor is further adapted to:
   calculate an absolute value of a sum of the first negative sequence component and the compensated negative sequence component to form a negative sequence operating current value;
   calculate an average of an absolute value of the first negative sequence component and an absolute value of the compensated negative sequence component to form a negative sequence restraint current value; and
   compare the negative sequence operating current value and the negative sequence restraint current value to a second dual slope differential element characteristic to form a second binary output.

9. The apparatus of claim 8, wherein the microprocessor is further adapted to:
   compare a predetermined percentage of a magnitude of the first positive sequence component to a magnitude of the first negative sequence component to form a third binary output; and
   apply an AND-function to the second binary output and an inverse of the third binary output to form a fourth binary output, the fourth output utilized to indicate a trip condition.

10. The apparatus of claim 9, wherein the fourth binary output indicates the trip condition when the magnitude of the first negative sequence component exceeds the predetermined percentage of the magnitude of the first positive sequence component, and the negative sequence operating current value to the negative sequence restraint current value is above a characteristic line of the second dual slope differential element characteristic; and
   wherein the fourth binary output indicates a no-trip condition when the predetermined percentage of the magnitude of the first positive sequence component exceeds the magnitude of the first negative sequence component.

11. The apparatus of claim 9, wherein the predetermined percentage is about ten percent.

12. The apparatus of claim 1, wherein the phase angle shift is based on a fixed phase shift.

13. A method for providing differential protection for a transformer having a load side and a source side in a three-phase power system, the differential protection including a positive sequence differential element and a negative sequence differential element, the method comprising:
deriving a first set of three phasors from incoming secondary currents detected on the source side and a second set of three phasors from outgoing secondary currents detected on the load side;
based on the first set of three phasors, calculating a first positive sequence component and a first negative sequence component;
based on the second set of three phasors, calculating a second positive sequence component and a second negative sequence component;
determining a phase angle shift based on a tap position of at least one tap changer and a predetermined number of degrees per step of the transformer, the phase angle shift introduced by operation of the transformer;
applying the phase angle shift to the second positive sequence component and the second negative sequence component to generate a compensated positive sequence component and a compensated negative sequence component, respectively; and
determining an operate current value and a restraint current value for each of the positive and negative sequence differential elements based on the compensated positive sequence component and the compensated negative sequence component.

14. The method of claim 13, wherein determining the phase angle shift comprises:
determining a number of steps from a reference position based on the tap position, the tap position adjustable to maintain a set point power flow in the three-phase power system; and
multiplying the number of steps by the predetermined number of degrees to yield the phase angle shift.

15. The method of claim 13, wherein applying the phase angle shift to the second positive sequence component and the second negative sequence component comprises:
multiplying the second positive sequence component by a first compensating phasor to generate the compensated positive sequence component, the first compensating phasor having a magnitude equal to one and a first phase angle opposite that of the phase angle shift; and
multiplying the second negative sequence component by a second compensating phasor to generate the compensated negative sequence component, the second compensating phasor having a magnitude equal to one and a second phase angle substantially equal to the phase angle shift.

16. The method of claim 13, wherein determining the operate current value and the restraint current value for each of the positive and negative sequence differential elements comprises:
calculating an absolute value of a sum of the first positive sequence component and the compensated positive sequence component to form a positive sequence operating current value;
calculating an average of an absolute value of the first positive sequence component and an absolute value of the compensated positive sequence component to form a positive sequence restraint current value; and
comparing the positive sequence operating current value and the positive sequence restraint current value to a first dual slope differential element characteristic of the positive sequence differential element to form a first binary output, the first binary output utilized to indicate a trip condition.

17. The method of claim 16, wherein the first binary output indicates the trip condition when the positive sequence operating current value to the positive sequence restraint current value is above a characteristic line of the first dual slope differential element characteristic, and wherein the first binary output indicates a no-trip condition when the positive sequence operating current value to the positive sequence restraint current value is below the characteristic line of the first dual slope differential element characteristic.

18. The method of claim 13, wherein determining the operate current value and the restraint current value for each of the positive and negative sequence differential elements further comprises:
calculating an absolute value of a sum of the first negative sequence component and the compensated negative sequence component to form a negative sequence operating current value;
calculating an average of an absolute value of the first negative sequence component and an absolute value of the compensated negative sequence component to form a negative sequence restraint current value; and
comparing the negative sequence operating current value and the negative sequence restraint current value to a second dual slope differential element characteristic of the negative sequence differential element to form a second binary output.

19. The method of claim 18, wherein determining the operate current value and the restraint current value for each of the positive and negative sequence differential elements further comprises:
comparing a predetermined percentage of a magnitude of the first positive sequence component to a magnitude of the first negative sequence component to form a third binary output; and
applying an AND-function to the second binary output and an inverse of the third binary output to form a fourth binary output, the fourth binary output utilized to indicate a trip condition.

20. The method of claim 19, wherein the fourth binary output indicates the trip condition when the magnitude of the first negative sequence component exceeds the predetermined percentage of the magnitude of the first positive sequence component, and the negative sequence operating current value to the negative sequence restraint current value is above a characteristic line of the second dual slope differential element characteristic; and
wherein the fourth binary output indicates a no-trip condition when the predetermined percentage of the magnitude of the first positive sequence component exceeds the magnitude of the first negative sequence component.

21. The method of claim 19, wherein the predetermined percentage is about ten percent.

22. A method for providing differential protection for a transformer having a first side and a second side in a three-phase power system, the differential protection including a positive sequence differential element and a negative sequence differential element, the method comprising:
calculating a first positive sequence component and a first negative sequence component associated with secondary currents detected on the first side, and calculating a second positive sequence component and a second negative sequence component associated with secondary currents detected on the second side;

applying a phase angle shift to the second positive sequence component and the second negative sequence component to form a compensated positive sequence component and a compensated negative sequence component, respectively, to compensate for a phase angle shift introduced by operation of the transformer; and determining an operate current value and a restraint current value for each of the positive and negative sequence differential elements based on the compensated positive sequence component and the compensated negative sequence component.

23. The method of claim 22, wherein determining the phase angle shift comprises:

determining a number of steps from a reference position based on the tap position, the tap position adjustable to maintain a set point power flow in the three-phase power system; and multiplying the number of steps by the predetermined number of degrees to yield the phase angle shift.

24. The method of claim 22, wherein applying the phase angle shift to the second positive sequence component and the second negative sequence component comprises:

multiplying the second positive sequence component by a first compensating phasor to generate the compensated positive sequence component, the first compensating phasor having a magnitude equal to one and a first phase angle opposite that of the phase angle shift; and multiplying the second negative sequence component by a second compensating phasor to generate the compensated negative sequence component, the second compensating phasor having a magnitude equal to one and a second phase angle substantially equal to the phase angle shift.

25. The method of claim 22, wherein determining the phase angle shift comprises:

determining a fixed phase shift of the transformer.

* * * * *